(12) United States Patent
Shen et al.

(10) Patent No.: US 7,720,974 B2
(45) Date of Patent: May 18, 2010

(54) GLOBAL ROUTABLE AND GRID IDENTIFICATION FOR AUDIO PROVIDER IN MEDIA SESSION

(75) Inventors: Li Shen, Bellevue, WA (US); Danny Levin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/754,004

(22) Filed: May 25, 2007

(65) Prior Publication Data

US 2008/0294783 A1 Nov. 27, 2008

(51) Int. Cl.
  *G06F 15/16* (2006.01)
(52) U.S. Cl. .................. 709/227; 709/202; 709/228; 370/401
(58) Field of Classification Search ......... 709/202–203, 709/227–230; 370/400–401
  See application file for complete search history.

(56) References Cited

U.S. PATENT DOCUMENTS

| 6,466,550 | B1 | 10/2002 | Foster et al. | |
|---|---|---|---|---|
| 6,628,767 | B1 | 9/2003 | Wellner et al. | |
| 7,007,235 | B1 | 2/2006 | Hussein et al. | |
| 7,366,975 | B1 * | 4/2008 | Lipton | 715/201 |
| 7,463,634 | B1 * | 12/2008 | Hansen | 709/227 |
| 7,466,810 | B1 * | 12/2008 | Quon et al. | 709/203 |
| 7,583,685 | B2 * | 9/2009 | Ajitomi et al. | 370/401 |
| 7,599,347 | B2 * | 10/2009 | Wang | 709/227 |
| 7,627,678 | B2 * | 12/2009 | Datta et al. | 709/227 |
| 2003/0125954 | A1 | 7/2003 | Bradley et al. | |
| 2003/0198195 | A1 | 10/2003 | Li | |
| 2005/0206721 | A1 | 9/2005 | Bushmitch et al. | |
| 2006/0018272 | A1 | 1/2006 | Mutikainen et al. | |
| 2006/0184624 | A1 * | 8/2006 | Thukral | 709/227 |
| 2006/0235981 | A1 | 10/2006 | Westman et al. | |
| 2007/0002831 | A1 | 1/2007 | Allen et al. | |

OTHER PUBLICATIONS

Pitroda, et al., "A Digital Conference Circuit for an Instant Speaker Algorithm", Jan. 12, 2007, at <<ieeexplore.ieee.org/xpl/absprintf.isp?arnumber=1090767&page=FREE>>, IEEE, 2006, pp. 1-2.

Rosenberg, "Obtaining and Using Globally Routable user Agent (UA) URIs (GRUU) in the Sessiojn Initiation Protocol (SIP)", available at least as early as Jan. 11, 2007, at <<.tools.ietf.org/pdf/draft-ietf-sip-gruu-08.pdf>>, The Internet Society, 2006, pp. 1-38.

Schulzrinne, et al., "Internet Telephony: architecture and protocols-an IETF perspective", available at least as early as Jan. 11, 2007, at <<.item.ntnu.no/~thanhvan/doc/SIParitical.pdf>>, Elsevier Science B.V., 1999, pp. 237-256.

Singh, et al., "Centralized Conferencing using SIP", available at least as early as Jan. 11, 2007, at <<.cs.columbia.edu/~kns10/publication/sipconf. pdf>>, Columbia Universty, pp. 1-7.

* cited by examiner

*Primary Examiner*—Bharat N Barot
(74) *Attorney, Agent, or Firm*—Merchant & Gould, P.C.

(57) ABSTRACT

Procedures for identifying audio clients in a media session are described. A gateway device may provide a unique identifier for identifying the audio client/user agent instance. In an example, a globally routable user agent universal resource indicator (GRUU) may be mapped to the gateway device servicing the audio client and a unique identifier may be provided. In examples, the gateway device may include a grid and grid value for identifying the audio client.

15 Claims, 2 Drawing Sheets

GLOBAL ROUTABLE AND GRID IDENTIFICATION FOR AUDIO PROVIDER IN MEDIA SESSION

BACKGROUND

Some media clients lack the ability to provide identification in a session, such as a media conference. For instance, while a publicly switched telephone network (PSTN) device may participate in a session initiated protocol (SIP) event, the PSTN phone may not identify itself (the device) within the conference. Thus, when providing content, the PSTN phone may not identify itself as the source of the audio data. Correspondingly, the other participating clients may not be able to identify the PSTN client within the session. Thus, another client may not target the PSTN client such as if the other client wishes to transfer a "call" or the like.

SUMMARY

Procedures for identifying audio clients in a media session are described. A gateway device may provide a unique identifier for identifying the audio client/user agent instance. In an example, a globally routable user agent universal resource indicator (GRUU) may be mapped to the gateway device servicing the audio client and a unique identifier may be provided. In examples, the gateway device may include a grid and grid value for identifying the audio client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described to identify an audio client providing content in a media session. In one or more implementations, systems are discussed in which an audio client joining a media session may be uniquely identified by a grid value. A globally routable user agent URI (GRUU) may be mapped to a gateway device servicing the audio client with a grid applied. Thus, the particular audio client (user agent) instance may be identified directly/indirectly through the GRUU (mapped to the gateway device), the grid, and grid value (identifying the client). The GRUU, grid, and grid value may be included as part of a header portion of a session initiated protocol (SIP) invite or other SIP signals for establishing, modifying, maintaining, terminating, and so on a session between clients. In this manner, the particular client may be identified for one or more application used in conjunction with the session. For instance, the unique identifier may be used across several application used in conjunction with the media session.

For example, the particular audio client may be identified among one or more address-of-record (AOR) if the audio client device supports multiple accounts, more than one handset, and so on. Thus, the particular client user agent instance may be used when transferring, re-inviting and/or other SIP signaling procedures or similar procedures. For audio clients that support limited functionality, such as phones having ring and audio send/receive functionality, the gateway device and/or other gateway (e.g., PSTN gateway) may bridge between the SIP environment and the PSTN environment (e.g., convert between packet data/traditional electrical telephone signaling). In implementations, the gateway device and PSTN gateway may be formed as a unit.

In further implementations, client identification information may be inserted into the real-time control protocol (RTCP) canonical name (CNAME) field (e.g., into a field in the RTCP control packets) for identifying the audio content provider. For example, the GRUU, gird and grid value may be included in a CNAME field for identifying the source of the content. Thus, the other clients may identify the audio client (e.g., the talker) based on the GRUU, grid, and grid value in the RTCP CNAME field.

In implementations, techniques are described in which a GRUU may be mapped to a gateway device which may service a one or more audio clients in a media session. The gateway device may provide a grid and a grid value for uniquely identifying an audio client within the session. For example, a GRUU, a grid, and a grid value may be included in a SIP invite header when establishing communications through a host, such as an audio/video switching server (AVMCU) for uniquely identifying the client (e.g., the user agent for the client).

Exemplary Environment

Figure 1:
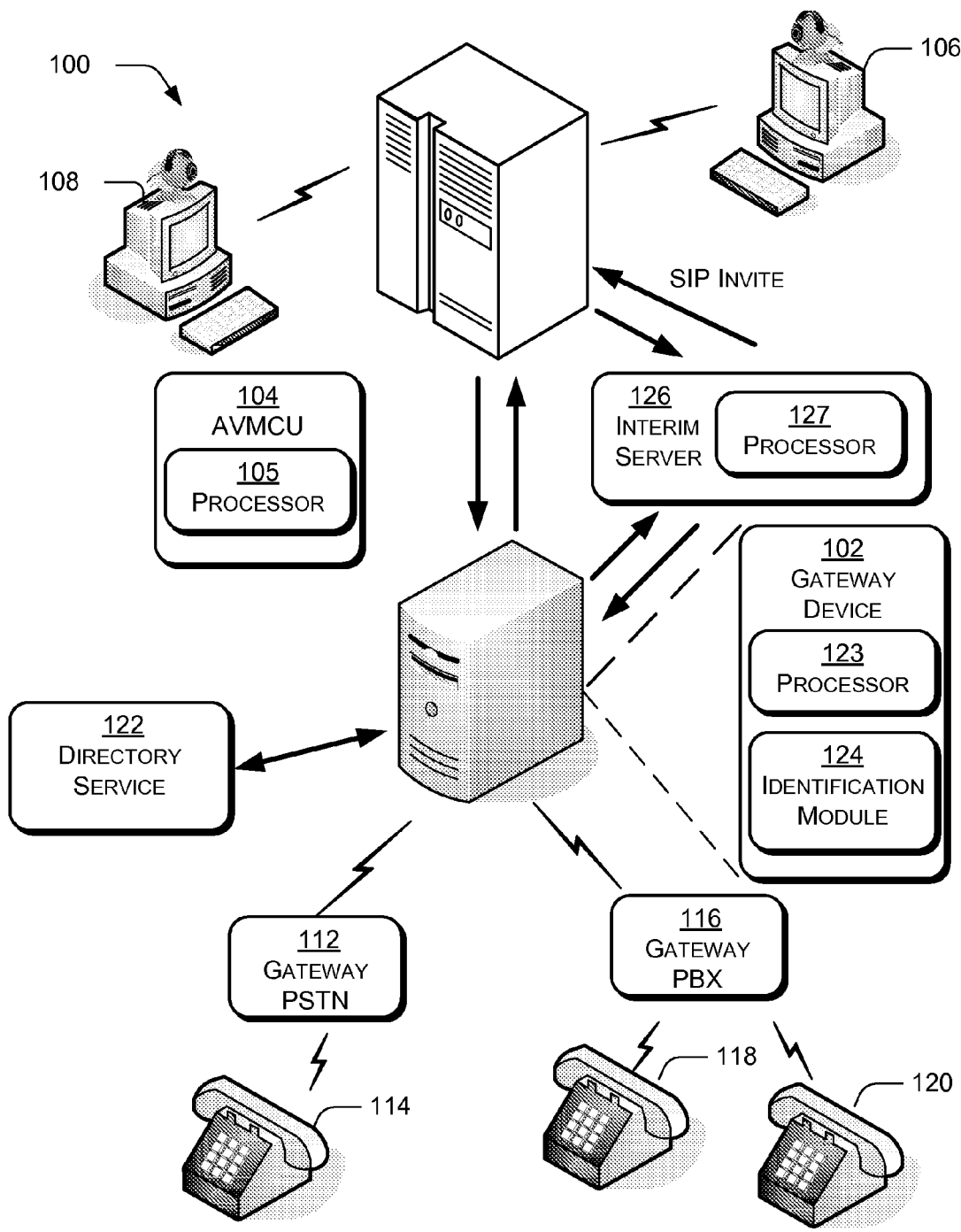
FIG. 1 illustrates an environment in an exemplary implementation that may use technologies to identify an audio client.

FIG. 1 illustrates an environment 100 in exemplary implementations that are operable to employ audio client identification. For example, a unique identifier may be used to identify a particular audio client joining (and subsequently participating) in a media session. While SIP procedures are discussed herein, the system and techniques may be used with other signaling methodologies.

In implementations, a gateway device 102 may be included for servicing a plurality of audio clients in a media conference or other SIP session. For example, the gateway device 102 may forward audio client media content to an audio/video switching server 104 (AVMCU). The AVMCU processor 105 may mix/switch a media session including audio/video client send/receive media streams (such as computers having a web camera and microphone 106, 108), in addition to, the audio clients and so on. For example, clients may have audio/video capability, may be able to obtain/send other media data such as white board information. Correspondingly, the gateway device 102 may forward content from the AVMCU 104 to the associated audio clients. While a AVMCU is described, the techniques and structures discussed herein may be used for other SIP events such as voice over internet protocol (VoIP) telephone calls and so on.

The gateway device 102 and audio/video clients may be connected to the AVMCU 104 via a network such as the Internet or other suitable communication networks. In further implementations, additional gateway devices may be included for performing in a substantially similar manner as the gateway device 102 discussed herein.

During signaling, such as when an audio client is attempting to join a media session, the audio client may join the session (e.g., a telephone participant calling into the session) by sending the gateway device 102 a request. For example, if a voice over internet protocol (VoIP) telephone is used, the "call" may be forwarded through the gateway device 102. For public switched telephones (such as a first and second public switched telephone network (PSTN) telephones), the gateway device 102 and a PSTN gateway 112 may bridge between the AVMCU 104 and the PSTN telephone(s) 114. In instances, a private branch exchange (PBX) gateway 116 may be interposed between the gateway device 102 and the audio client. For example, an enterprise may use a PBX gateway 116 for telephones located in a branch office (a first PBX telephone 118 and a second PBX telephone 120 are discussed). For PSTN or PBX connected telephones, the PSTN gateway and the client phones may be connected using a standard land line or two wire system, while subsequent communication may be communicated over networks supporting packet data transport. In other instances, the gateway device may function as a PBX or PSTN gateway so that audio content flows from the audio client to the gateway device and to a AVMCU or other servers to a target client or clients.

While an audio client initiated request is discussed, other invitation mechanisms may occur. For example, a current client may request an audio client join the media conference or session. In this situation, the request may be forwarded via the AVMCU 104, and the gateway device 102 before being forwarded through a PSTN gateway to the target audio client. In implementations, the gateway device may additionally function as a PSTN gateway and/or a BPX gateway. For example, audio client content may flow to the gateway device 102 and to the AVMCU 104. In other implementations, the gateway device may act as an intermediate as a VoIP conversation passes from the client through the gateway device to one or more intermediary servers before reaching a target client.

As part of joining a session, the gateway device 102 may access a directory service 122 such as an ACTIVE DIRECTORY (Microsoft Corporation, Redmond, Wash.) service. The directory service may include management information regarding the client. For example, the directory service may provide information regarding the client capabilities and so on for use in SIP signaling (e.g., joining the client in the media session). Additionally, utilities, such as WINDOWS Management Instrumentation (WMI) available from Microsoft Corporation, Redmond, Wash., may be used for obtaining relevant property information in conjunction with the directory service. For example, the WMI may provide the GRUU to gateway device. The directory service may be included in the gateway device 102 or be maintained in an ancillary device operating in conformance with WMI.

The gateway device processor 123 may generate a unique identifier for the audio client (e.g., the particular client instance). For example, the gateway device 102 may include an identification module 124 which inserts a GRUU for the gateway device 102 and generates a grid and grid value. The latter value may uniquely identify the particular instance for the audio client audio media stream. Thus, the particular audio client (e.g., the user agent instance) may be identified from among the address-of-record properties for the audio client's user agent, if applicable. For limited functionality audio clients (such as PSTN telephones having ring and send/receive capability), the signaling may be directed to a common user agent instance as the device may not support higher multiple functionalities which may employ multiple user agents.

The gateway device 102 may forward to an interim server 126 the client request, the GRUU, the grid, and the grid value. Additionally, the directory service information may be included. The interim server 126 may function as an intermediary when joining session clients, maintaining the session, terminating the session and so on (e.g., during SIP signaling). For example, the interim server 126 may generate and send, via the host (the AVMCU 104), a SIP invite, or signaling protocol request for establishing a communication. For example, the interim server 126 may be a MICROSOFT Live Communication Server (Microsoft Corporation, Redmond, Wash.). Resultant content communications may flow between the AVMCU 104, the gateway device 102, and to the audio client. Put another way, while the interim server 126 may participate in signaling (i.e., SIP procedures), the interim server 126 may not participate in media transfers. In other instances, the content may flow from the gateway device through other intermediary severs to a target client. For example, while the gateway device may insert the GRUU, grid, and grid value, the SIP invite may be included in the SIP invite contact header for identifying the client sent routed through the interim server. Other configurations may be available as well.

The gateway device 102 may generally function as a proxy for the plurality of phones. For example, when communicating audio content, the gateway device 102 may forward media content between the AVMCU 104 and the individual audio clients. Thus, the gateway device 102 may insert a globally routable user agent URI (GRUU) and include a grid and a grid value for the particular instance. For example, the grid value may be inserted into the CNAME filed in the RTCP packet. The GRUU, the grid, and grid value may also be used for identifying the particular client while establishing, maintaining, modifying or terminating the media session. In this fashion, the particular user agent for the audio client may uniquely identifiable by the GRUU, the grid and grid value. For example, if a SIP re-invite were issued, the particular audio client instance may be signaled.

During media content communication, the GRUU, the grid, or the grid value (or combinations thereof) may be inserted into control information packets. For example, the gateway device 102 may insert the GRUU, grid and grid value in the RTCP CNAME field to identify the source of the audio content. For instance, the GRUU, grid and grid value may be inserted in a RTCP packet included for controlling real-time protocol (RTP) data flow so that the talker may be uniquely identified based on the client device being employed. Additionally, an audio client user may input (such as through a touch pad) a name or moniker which may be associated with the GRUU, grid and grid value which may be displayed on audio/video client display screens when the audio client is providing media content.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory storage devices, e.g., memory.

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes methodologies that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 2:
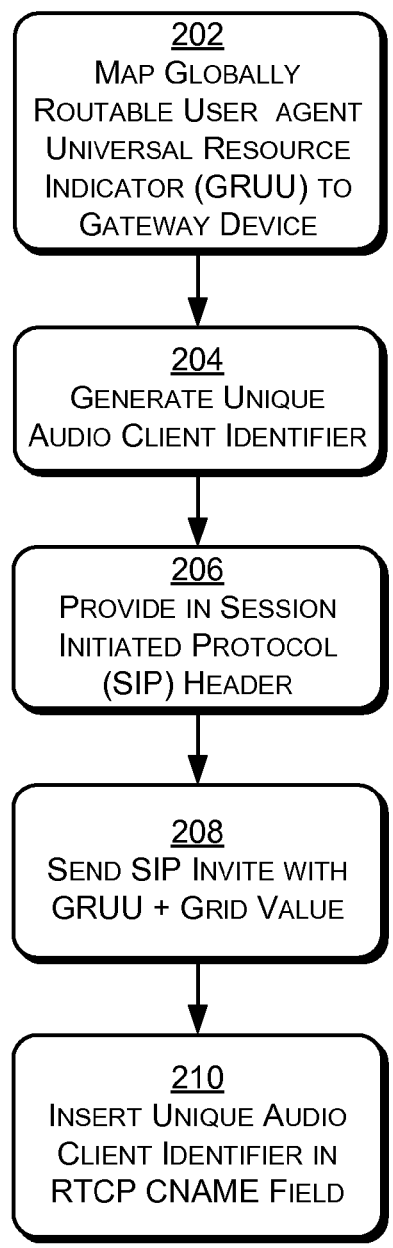
FIG. 2 is a flow diagram depicting a procedure in an exemplary implementation in which a unique identifier identifies an audio client.

FIG. 2 discloses exemplary procedures for using grid identification for media session audio clients. For example, the techniques discussed herein may be used during signaling (e.g., SIP procedures), as well as, with media content transport, for identifying an audio client or talker.

In conjunction with SIP signaling, a gateway device processor may insert 202 a mapped GRUU, for globally identifying the gateway device, into the SIP invite. For example, the GRUU may be included in a SIP invite contact header, and so on. In this manner, another client user agent, signaling the audio client, associated with the gateway device, may rout the audio client SIP invite request via the gateway device GRUU. For example, another client user agent may use the GRUU when signaling a PSTN telephone audio client.

The gateway device may generate 204 a unique identifier for the audio client. The identifier may uniquely identify the audio client/user agent instance for one or more applications. For example, the gateway device identification module in conjunction with a processor may generate a grid and grid value so that the audio client may be uniquely identified. For example, the audio client may be identified from among the audio clients serviced by the gateway device. The audio client identification may be done at the stream level so that the particular audio client user agent instance associated with the stream is identified. In some implementations, the identification may be associated with more than one audio client, such as if the audio client streams are combined when forwarded through a PSTN gateway.

When issuing a SIP invite, the grid and grid value may be provided 206, such as by the gateway device processor, in the contact header along with the GRUU mapped to the gateway device. For example, the gateway device may identify the audio client based on the GRUU, grid, and grid value (uniquely identifying the client among the client indicated by the grid) included in the SIP invite contact header. Thus, an interim server may send 208 the host the SIP invite including the inserted GRUU, grid and grid value in accordance with SIP procedures. In implementations, an intermediary server may be used for SIP communications between the gateway device and the host or other intermediary server. For example, if an audio client attempts to join a media session, the GRUU, grid and grid value may identify the audio client/particular user agent instance for the audio client to other clients in the media session via the AVMCU server. For example, a server functioning in accordance with MICROSOFT Live Communication Server (Microsoft Corporation, Redmond, Wash.) may be used.

During content transfer, the gateway device may insert 210 the GRUU, grid, or grid value (or combinations thereof) into data flow control packets. For example, the GRUU, grid and grid value may be included in a CNAME field in a RTCP packet header as the gateway device forwards audio content to the AVMCU. RTCP may be used to control the data flow occurring in a RTP fashion.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for identifying an audio client in a media session, the method comprising:
   mapping a globally routable user agent universal resource indicator (GRUU) to a gateway device servicing the audio client in the media session;
   generating a unique identifier for identifying the audio client in the media session, the unique identifier comprising:
   an identification of a grid;
   a grid value identifying the audio client; and
   the GRUU;
   associating the unique identifier with the audio client; and
   providing the unique identifier to one or more clients in the media session.

2. The method as described in claim 1, wherein the unique identifier is based on a particular instance associated with the audio client.

3. The method as described in claim 1, wherein the unique identifier is associated with the audio client content stream in a real-time control protocol (RTCP) canonical name (CNAME) field.

4. The method as described in claim 1, wherein the method is conducted in conjunction with a session initiated protocol (SIP).

5. The method as described in claim 1, wherein the unique identifier is provided in session initiated protocol (SIP) header.

6. The method as described in claim 1, wherein the audio client is a public switched telephone network (PSTN) telephone.

7. One or more computer-readable storage media comprising computer-executable instructions that, when executed by a processor communicatively coupled to the one or more computer-readable storage media, direct a computing system to:
   map a globally routable user agent universal resource indicator (GRUU) to a gateway device servicing an audio client in a media session;
   generate a unique identifier for identifying the audio client in the media session, the unique identifier comprising:
   an identification of a grid;
   a grid value identifying the audio client; and
   the GRUU;
   associate the unique identifier with the audio client; and
   send a session initiated protocol (SIP) invite to one or more clients in the media session, the SIP invite including a header having the unique identifier and a unique audio stream identifier identifying a particular audio client instance.

8. The one or more computer-readable storage media as described in claim 7, wherein the audio client is a public switched telephone network (PSTN) telephone.

9. The one or more computer-readable storage media as described in claim 7, wherein the SIP invite is sent by a server which is not a party to a content communication of the particular audio client instance.

10. The one or more computer-readable storage media as described in claim 7, wherein the unique identifier is included in a real-time control protocol (RTCP) canonical name (CNAME) field associated with the particular audio client instance.

11. A system comprising:

a gateway device servicing a plurality of audio clients in a media session, the gateway device being configured to:

receive a globally routable user agent universal resource indicator (GRUU) identifying the gateway device;

generate a grid identification and a grid value identifying an individual audio client included in the plurality of audio clients; and generate a unique identifier that identifies the individual audio client in the media session, the unique identifier comprising the GRUU, the grid identification, and the grid value; and forward the unique identifier to an interim server; and the interim server communicatively coupled to the gateway device and being configured to:

generate a session initiated protocol (SIP) invite;

insert the forwarded unique identifier into an SIP invite header; and send the SIP invite having the SIP invite header to the plurality of audio clients in the media session.

12. The system as described in claim 11, wherein the interim server does not participate in transporting individual audio client content.

13. The system as described in claim 11, wherein the grid value identifies a particular individual audio client instance.

14. The system as described in claim 11, wherein the individual audio client is a public switched telephone network (PSTN) telephone.

15. The system as described in claim 11, wherein the gateway device inserts the grid value in a real-time control protocol (RTCP) canonical name (CNAME) field.

* * * * *